United States Patent [19]
Przelomiec

[11] Patent Number: 5,862,486
[45] Date of Patent: Jan. 19, 1999

[54] DOWNBANDED CELLULAR SYSTEMS AND METHODS

[75] Inventor: Thomas A. Przelomiec, Lynchburg, Va.

[73] Assignee: Ericsson Inc., Research Triangle Park, N.C.

[21] Appl. No.: 622,311

[22] Filed: Mar. 27, 1996

[51] Int. Cl.$^6$ ....................................................... H04Q 7/28

[52] U.S. Cl. ........................... 455/454; 455/453; 455/509; 370/343

[58] Field of Search .................................... 455/447, 448, 455/451, 452, 450, 453, 454, 449, 509, 522, 104, 103, 552, 553, 426, 93; 370/329, 340, 343

[56] References Cited

U.S. PATENT DOCUMENTS

| | | | |
|---|---|---|---|
| 4,914,651 | 4/1990 | Lusignan | 370/329 |
| 5,119,397 | 6/1992 | Dahlin et al. | 375/216 |
| 5,371,898 | 12/1994 | Grube et al. | 455/552 |
| 5,497,503 | 3/1996 | Rydberg et al. | 455/454 |

FOREIGN PATENT DOCUMENTS 2 252 699  8/1992  United Kingdom .

OTHER PUBLICATIONS

*Electronics & Communications In Japan,* "Method of Rejecting Channel Interference Using an Adaptive Equalizer", Part 1, vol. 72, No. 11, Nov. 1989, pp. 1–10.

PCT International Search Report for International Application No. PCT/US 97/03808, dated Jun. 30, 1997.

*Primary Examiner*—Wellington Chin
*Assistant Examiner*—Lee Nguyen
*Attorney, Agent, or Firm*—Burns, Doane, Swecker & Mathis, L.L.P.

[57] ABSTRACT

The present invention provides techniques for adapting the portion of the frequency spectrum allocated to Land Mobile Radio (LMR) for use as downbanded cellular channels. These downbanded cellular channels can be employed, for example, either to supplement a cellular operator's system capacity or as a stand alone cellular-style system which can provide complementary geographic coverage which may, for example, bridge existing Cellular systems. According to a first aspect of the present invention, the conventional channelization of the LMR spectrum is redefined in a manner which provides significant advantages. More specifically, for every six originally specified, 25 KHz LMR channels, five new 30 KHz DBC channels are specified. In this way, complete compatibility with cellular systems, e.g,. allowing roaming between cellular and DBC systems, is achieved according to the present invention.

10 Claims, 12 Drawing Sheets

FIG. 1A
(PRIOR ART)

| SYSTEM | MHZ | NUMBER OF CHANNELS | BOUNDARY CHANNEL NUMBER | TRANSMITTER CENTER FREQUENCY, MHZ MOBILE | TRANSMITTER CENTER FREQUENCY, MHZ BASE |
|---|---|---|---|---|---|
| (NOT USED) | | 1 | (990) | (824.01) | (869.01) |
| A" | 1 | 33 | 991 | 824.040 | 869.040 |
| | | | 1023 | 825.000 | 870.000 |
| A | 10 | 333 | 1 | 825.030 | 870.030 |
| | | | 333 | 834.990 | 879.990 |
| B | 10 | 333 | 334 | 835.020 | 880.020 |
| | | | 666 | 844.980 | 889.980 |
| A' | 1.5 | 50 | 667 | 845.010 | 890.010 |
| | | | 716 | 846.480 | 891.480 |
| B' | 2.5 | 83 | 717 | 846.510 | 891.510 |
| | | | 799 | 848.970 | 893.970 |

FIG. 1B
(PRIOR ART)

| TRANSMITTER | CHANNEL NUMBER | CENTER FREQUENCY MHZ |
|---|---|---|
| MOBILE | $1 \leq N \leq 799$ | $0.030(N) + 825.000$ |
| | $990 \leq N \leq 1023$ | $0.030(N-1023) + 825.000$ |
| BASE | $1 \leq N \leq 799$ | $0.030(N) + 870.000$ |
| | $990 \leq N \leq 1023$ | $0.030(N-1023) + 870.000$ |

FIG. 2A
(PRIOR ART)

| SYSTEM | MHz | NUMBER OF CHANNELS | BOUNDARY CHANNEL NUMBER | TRANSMITTER CENTER FREQUENCY, MHz MOBILE | TRANSMITTER CENTER FREQUENCY, MHz BASE |
|---|---|---|---|---|---|
| D (SMR) | 18 | 720 | 1 | 806.0125 | 851.0125 |
| | | | 720 | 823.9875 | 868.9875 |
| (NOT USED) | | 1 | (990) | (824.01) | (869.01) |

FIG. 2B
(PRIOR ART)

| TRANSMITTER | CHANNEL NUMBER | CENTER FREQUENCY, MHz |
|---|---|---|
| MOBILE | $1 \leq N \leq 720$ | $0.025(N) + 805.9875$ |
| BASE | $1 \leq N \leq 720$ | $0.025(N) + 850.9875$ |

| SYSTEM | MHZ | NUMBER OF CHANNELS | BOUNDARY CHANNEL NUMBER | TRANSMITTER CENTER FREQUENCY, MHZ MOBILE | TRANSMITTER CENTER FREQUENCY, MHZ BASE |
|---|---|---|---|---|---|
| (NOT USED) |  | 1 | (1) | (806.01) | (851.01) |
| C (SMR) | 18 | 599 | 2 / 600 | 806.04 / 823.98 | 851.04 / 868.98 |
| NOT USED |  | 1 | (990) | (824.01) | (869.01) |

FIG. 6B

| TRANSMITTER | CHANNEL NUMBER | CENTER FREQUENCY MHZ |
|---|---|---|
| MOBILE | $1 \leq N \leq 600$ | $0.030(N) + 805.980$ |
| BASE | $1 \leq N \leq 600$ | $0.030(N) + 850.980$ |

DOWNBANDED CELLULAR SYSTEMS AND METHODS

RELATED APPLICATIONS

This application is related to U.S. patent application Ser. No. 08/622,403, entitled "A Method and Apparatus for Locating a Digital Control Channel in a Downbanded Cellular System", to T. Przelomiec and K. Raith, filed on the same day as the present application and is related to U.S. patent application Ser. No. 08/622,631, entitled "Control Channel Synchronization Between DBC and Cellular Networks", to T. Przelomiec and T. Brown, filed on the same day as the present invention. The disclosure of these related applications is expressly incorporated here by reference.

BACKGROUND

The present invention relates generally to radiocommunication systems and, more particularly, to systems and methods for increasing the capacity and/or coverage area of cellular-type communication systems.

The rapid growth of cellular communication systems has compelled designers to search for ways in which system capacity can be increased without reducing communication quality beyond consumer tolerance thresholds. One way in which increased capacity can be provided is by increasing the efficiency in which the available Cellular spectrum is used, e.g., by changing from analog to digital communication techniques. In North America, this change was implemented by transitioning from the analog AMPS system to a digital system (D-AMPS) which was standardized as IS-54B and later as IS-136. Other technological improvements, such as the implementation of Time Division Multiple Access instead of Frequency Division Multiple Access, have also increased Cellular system capacity.

Figure 1A:
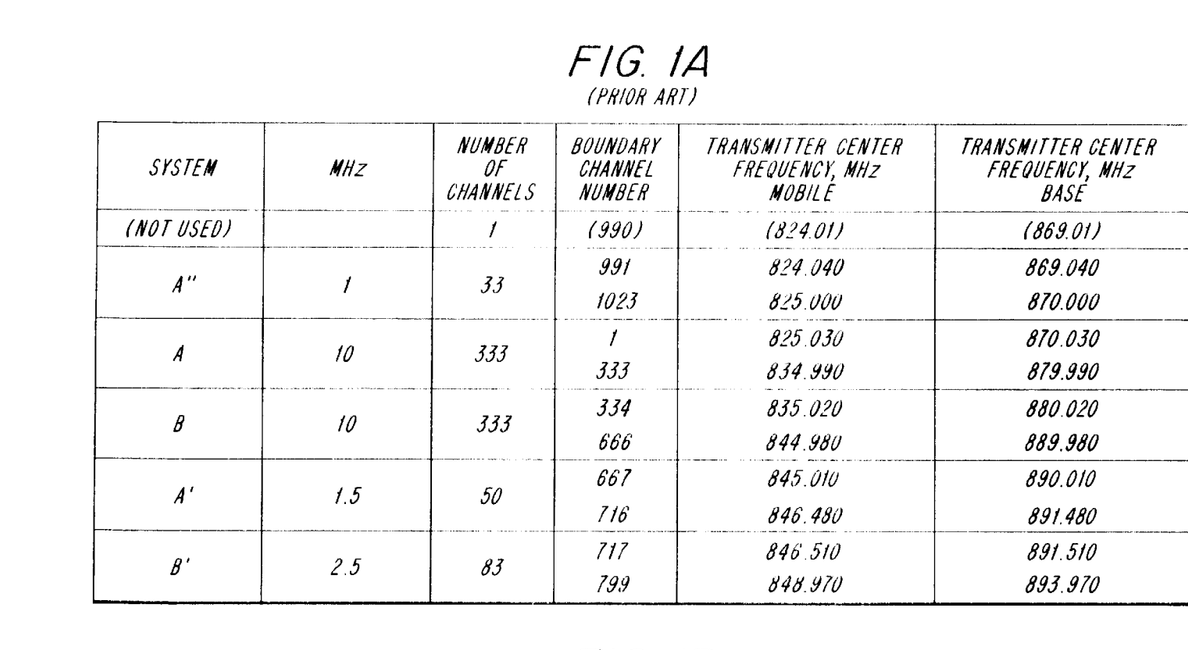
FIGS. 1A and 1B are tables which show conventional Cellular band channel assignments.
Figure 1B:
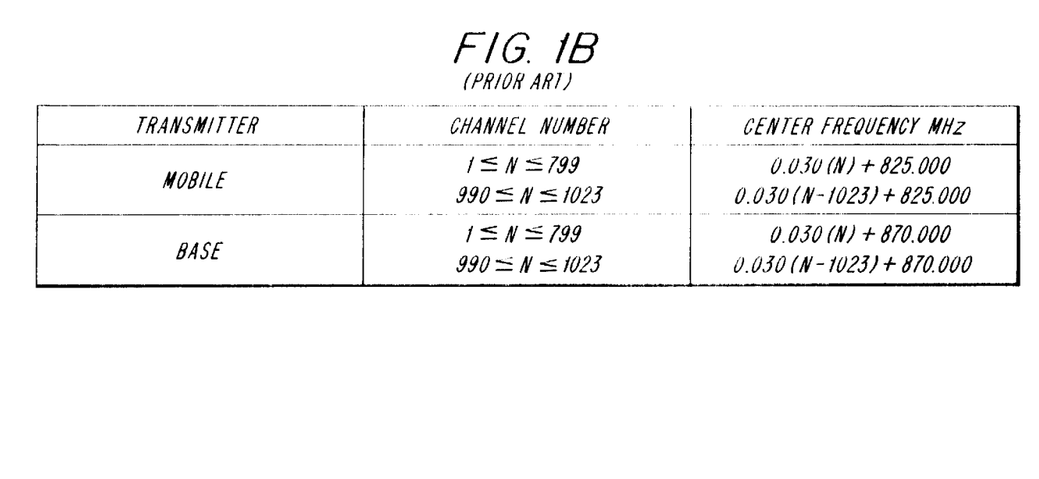

Even with the implementation of more spectrally efficient technologies, the capacity of cellular communication systems continues to be a concern. Another way in which the capacity of Cellular communications system can be increased is to provide additional spectrum. For example, the FCC originally allocated two blocks of frequencies (i.e., 825–845 MHz (uplink) and 870–890 MHz (downlink)) for Cellular band service in the United States. In 1987, the FCC allocated an additional 5 MHz to each block to increase Cellular systems' capacity. The current Cellular bandwidth allocation in the United States, complete with channel numbering, is illustrated in the tables shown in FIGS. 1A and 1B. Therein, FIG. 1B shows how the transmitter center frequencies can be determined for each channel described in FIG. 1A. Of course, this solution has natural limits since the usable frequency spectrum is finite and other, existing system types already own portions of the usable spectrum.

Figure 2A:
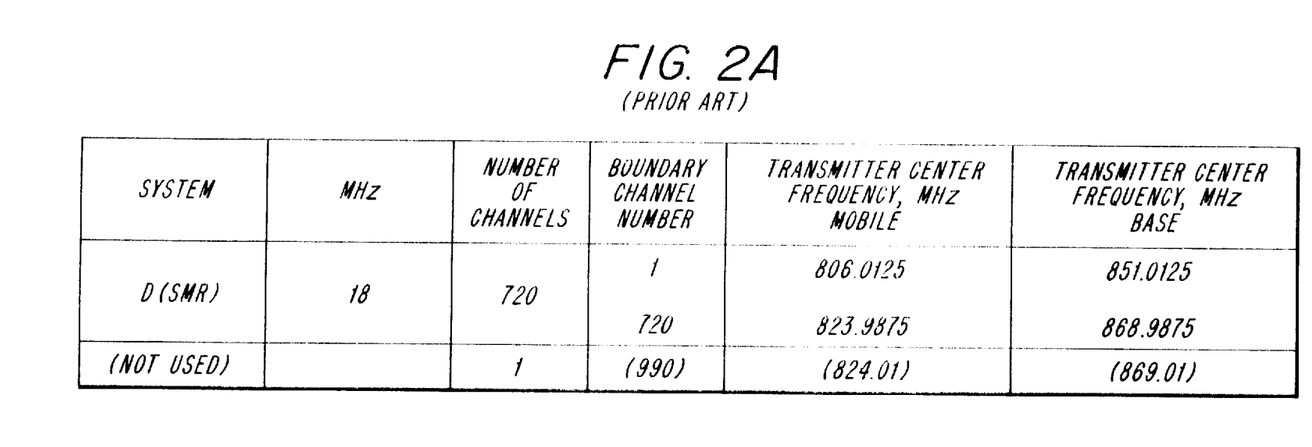
FIGS. 2A and 2B are tables which apportion the 18 MHz of LMR spectrum into equivalent 25 KHz channel assignments.
Figure 2B:
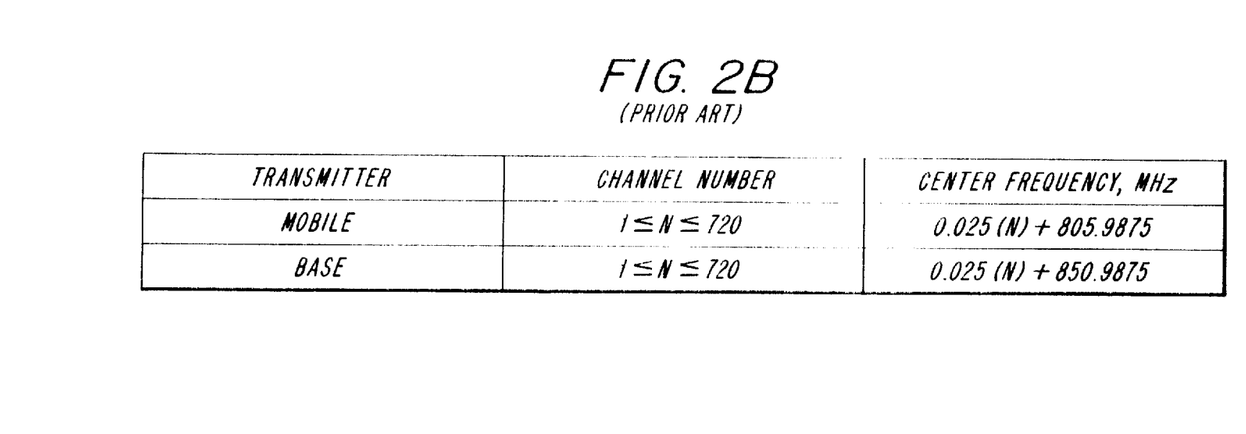

For example, Land Mobile Radio (LMR) systems are allocated frequency blocks which are contiguous with those of the Cellular band, i.e., 806–824 MHz (uplink) and 851–869 (downlink). The conventional channel assignments for the LMR spectrum are illustrated in the tables of FIGS. 2A and 2B. LMR systems are transmission trunked systems that are commonly used to provide radio communication service between individual units of a particular organization. For example, police departments use a version of LMR (commonly referred to as public service trunked (PST) systems) to communicate between patrol cars and headquarters. Unlike Cellular systems, however, LMR systems have historically been implemented as large independent sites serviced by one (or a few) transmitting base stations, rather than over a wide geographical area serviced by many transmitting base stations as in Cellular systems. At each LMR site, an operator can be allocated a portion of the LMR spectrum within which a fixed frequency pair is selected for use as a control channel while all of the other frequencies can be used for traffic.

In 1994, the FCC announced that the frequency spectrums which have been allocated for LMR, Cellular and Personal Communications Systems (PCS) would be uniformly regulated, such that an operator can use frequencies within the joint bandwidth in any desired manner. Coupled with other regulatory changes, for example those which allow LMR spectrum to be licensed on a wide-area basis rather than a site-by-site basis, it has now become realistic to consider using LMR frequencies in non-conventional ways, e.g., using cellular communication techniques. This usage of the LMR spectrum is termed herein "downbanded cellular (DBC)".

To implement DBC systems which are highly cellular compatible, several challenges must first be addressed. For example, conventional LMR systems operating in the United States have 25 KHz channel widths, whereas Cellular systems operating in accordance with IS-54B have 30 KHz channel widths. Other issues, such as adjacent channel interference, are also a concern.

SUMMARY

Accordingly, the present invention provides techniques for adapting the portion of the frequency spectrum allocated to Land Mobile Radio (LMR) for use as downbanded cellular channels. These downbanded cellular channels can be employed, for example, either to supplement a cellular operator's system capacity or as a stand alone cellular-style system which can provide complementary geographic coverage which may, for example, bridge existing Cellular systems.

According to a first aspect of the present invention, the conventional channelization of the LMR spectrum is redefined in a manner which provides significant advantages. More specifically, for every six originally specified, 25 KHz LMR channels, five new 30 KHz DBC channels are specified. In this way, complete compatibility with cellular systems, e.g., allowing roaming between cellular and DBC systems, is achieved according to the present invention.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 3A:
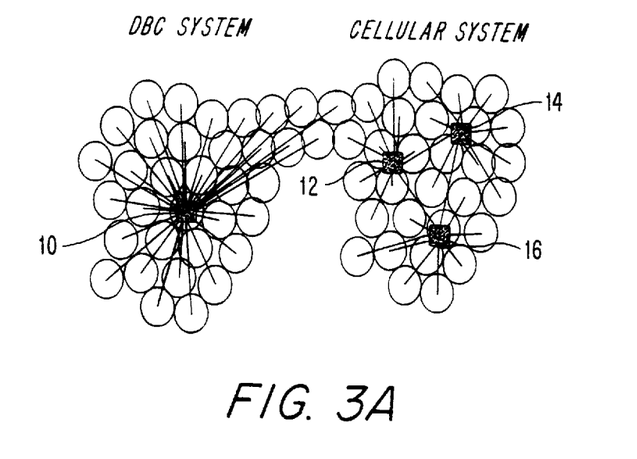
FIG. 3A illustrates a DBC system according to the present invention that is adjacent to a conventional cellular system

The vision for downbanded cellular systems includes both the provision of stand-alone DBC systems which utilize the LMR spectrum and provide enhanced communication services, as well as cooperative applications of DBC systems and Cellular systems. For example, FIG. 3A illustrates one such cooperative application of DBC systems. In the figure, a DBC system is positioned adjacent to a Cellular system. The DBC system is illustrated as having a plurality of cells each of which are supported by a mobile switching center (MSC) 10. Similarly, the Cellular system has a plurality of cells supported by three MSCs 12, 14 and 16. Each cell includes one or more base stations (not shown) connected to their respective MSC for transmitting signals to, and receiving signals from, mobile stations within the cell. In this exemplary configuration, the DBC system provides additional geographic coverage which would allow, for example, the operator of the Cellular system to provide greater geographic service to its customers.

Figure 3B:
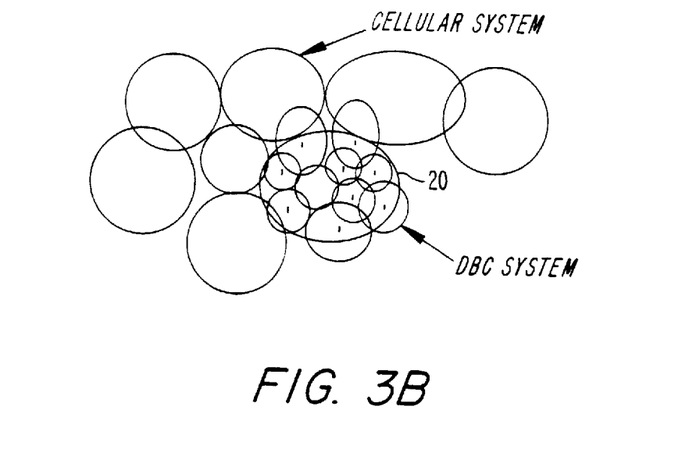
FIG. 3B illustrates a DBC system according to the present invention that is coincident with a conventional cellular system.

Another cooperative example is illustrated in FIG. 3(*b*). Therein, each of the larger circles and ellipses represents a Cellular system and each of the smaller circles within Cellular system 20 represents a DBC system. Thus, this example illustrates a case where DBC systems are coincident with a Cellular system and can be used to supplement the Cellular system's capacity.

Having described exemplary applications of DBC systems at a cell level, some general details of base stations and mobile stations are provided to round out this discussion, but without providing an unnecessary amount of detail that might obscure the present invention. Those skilled in the art will appreciate that DBC base stations and mobile stations can be manufactured using substantially the same components as conventional Cellular base stations and mobile stations, with certain exceptions, e.g., DBC equipment will have the rf capability to operate in the LMR frequency band. Readers interested in obtaining additional information relating to more specific details of exemplary mobile and base station implementations are directed to copending U.S. patent application Ser. No. 07/967,027 entitled "Multi-Mode Signal Processing" filed on Oct. 27, 1992 to P. Dent and B. Ekelund, which disclosure is incorporated here by reference. DBC systems can also be implemented in general accordance with D-AMPS as specified in EIA/TIA IS-54B and IS-136, the disclosures of which are also incorporated here by reference.

Figure 4:
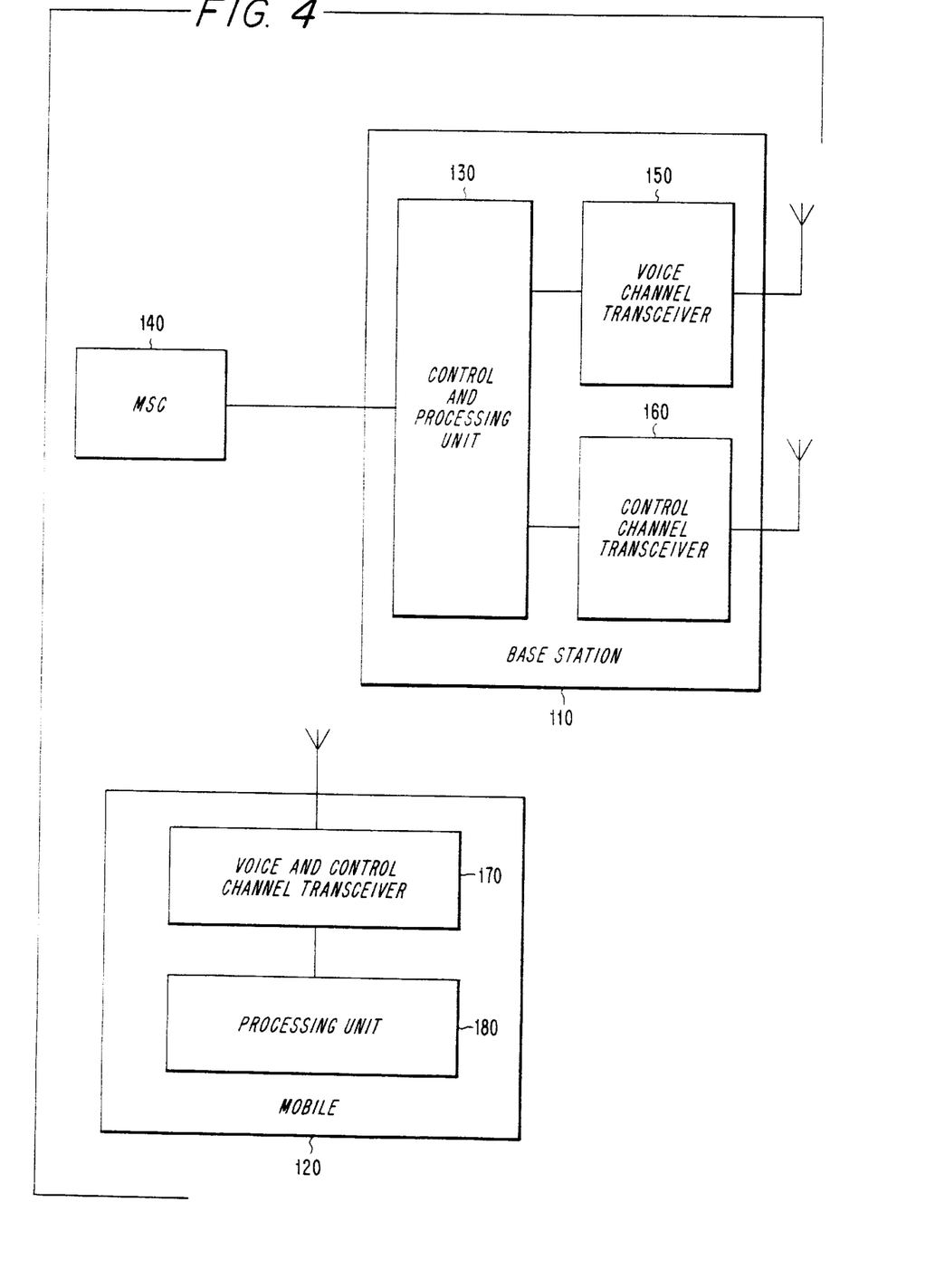
FIG. 4 is a block diagram of a portion of an exemplary radio communication system according to the present invention.

FIG. 4 represents a block diagram of a portion of an exemplary downbanded cellular radiocommunication system according to one embodiment of the present invention which can be used to implement the foregoing. The system shows an exemplary base station 110 and a mobile 120. The base station includes a control and processing unit 130 which is connected to the MSC 140 which in turn is connected to the public switched telephone network (not shown). Since DBC systems are completely Cellular compatible, MSC 140 can be identical to the switching equipment used in Cellular systems.

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver handles the traffic or voice channels. When the mobile 120 first enters the idle mode, it will locate a DBC control channel from which it can acquire overhead information and listen for pages. In conventional LMR systems, a control channel was identified by the processing unit 180 tuning the mobile station's voice/control channel transceiver 170 to a control channel, which control channel has been preprogrammed into the mobile station by the network operator. This technique, however, is not appropriate for DBC systems in which control channels can be placed on any DBC channel frequency. Exemplary techniques for locating a DBC control channel are described in the above-incorporated U.S. Patent Application entitled "A Method and Apparatus for Locating a Digital Control Channel in a Downbanded Cellular System".

Thus far, the description of DBC systems closely parallels that of traditional Cellular systems. However, several problems were faced by Applicant in adapting the LMR portion of the spectrum to usage for DBC systems. The first of these difficulties relates to the historical usage of 25 KHz channel widths in the LMR spectrum as opposed to the 30 KHz channel widths used in many Cellular systems. To provide maximum equipment compatibility between DBC and Cellular systems, it is desirable to provide DBC channels that also have 30 KHz channel widths.

Figure 5:
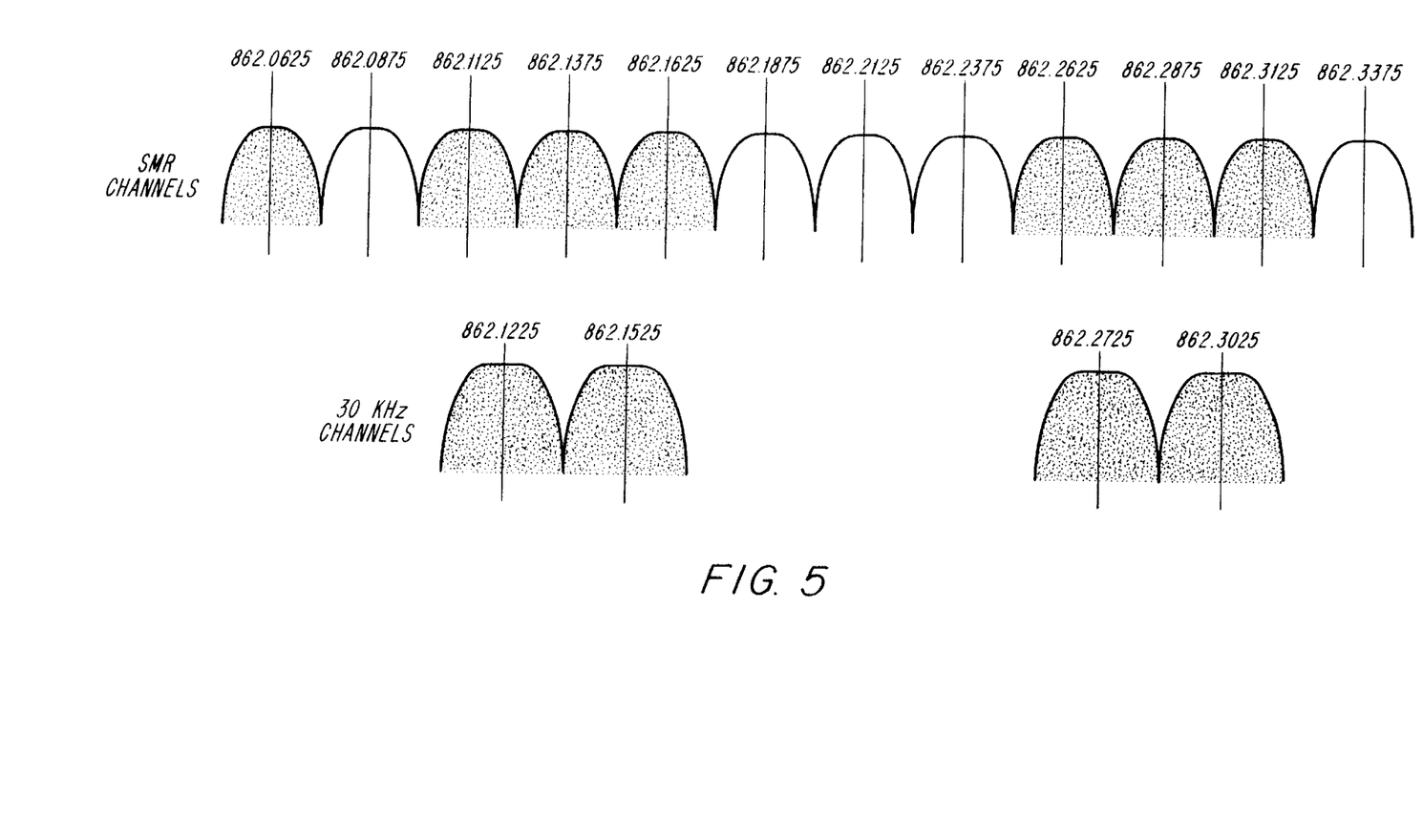
FIG. 5 illustrates one hypothetical mapping of conventional 25 KHz LMR channels into 30 KHz channels.

There are many ways in which 30 KHz channels could be specified for the LMR spectrum. For example, each network operator could decide independently where to position a 30 KHz channels based upon the portions(s) of the LMR spectrum owned by that network operator. Of course, at least two contiguous 25 KHz channels need to be owned by a network operator to provide sufficient bandwidth for a single 30 KHz channel. Since network operators in different geographic areas will frequently own different patterns of the LMR spectrum, allowing the network operators to select where the 30 KHz channels will be placed (i.e., allowing them to determine the center frequencies of each new 30 KHz channel) would likely provide different results as each network operator attempts to maximize his or her system's capacity. For example, consider the representation of the LMR spectrum illustrated in FIG. 5. Therein, the darkened parabolas indicate channels which are owned by one network operator while the unshaded parabolas represent channels owned by other operators. As can be seen from the figure, this particular operator has two sets of three contiguous 25 KHz LMR channels. To maximize 30 KHz channel capacity, this operator could, if permitted to locate a 30 KHz channel at any given center frequency, convert these two sets of three LMR channels into two sets of two 30 KHz channels. However, Applicant has recognized that, although spectrally efficient, allowing network operators to select the frequencies at which 30 KHz channels will be centered would seriously impair compatibility between different DBC systems and between DBC systems and Cellular systems. Without knowledge of where each system's channels are located, roaming between systems would become much more complicated. For example, a set of frequency centers for each network operator would need to be stored in an EEPROM (not shown) in the mobile station so that the mobile would know which frequencies were associated with each channel number for a given network. Since EEPROM memory is expensive this solution is uneconomical.

Figure 6A:
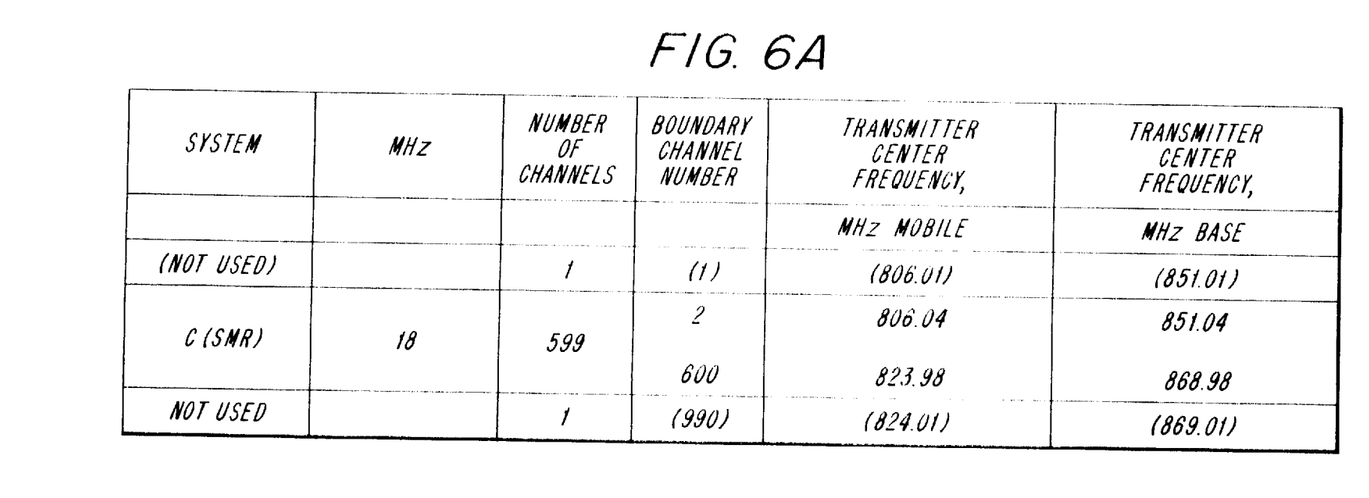
FIGS. 6A and 6B are tables which illustrate channel assignments of the LMR spectrum for DBC channels according to the present invention.
Figure 6B:
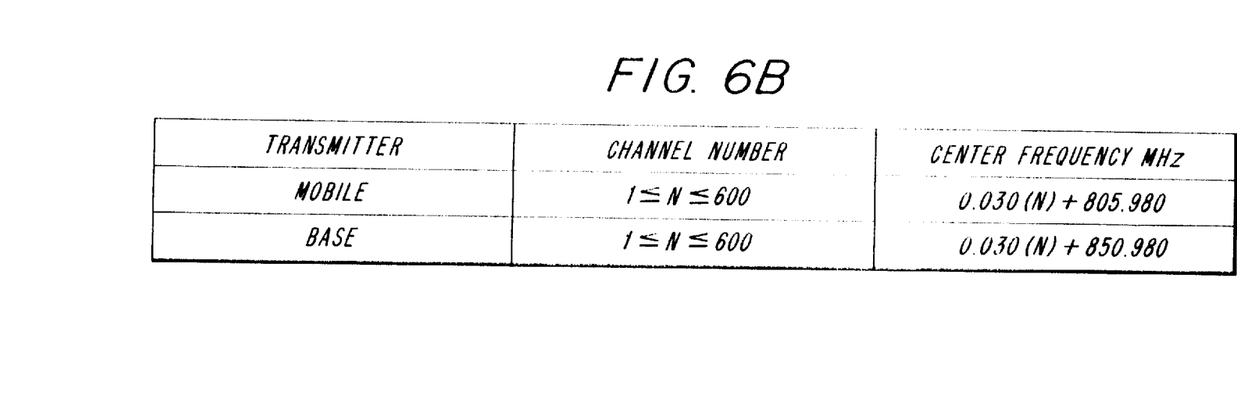

Thus, according to one aspect of the present invention, Applicants have specified the channel centers for DBC channels in such a way as to maximize compatibility with existing cellular systems. An exemplary specification is illustrated in FIGS. 6A and 6B wherein the transmitter center frequencies referred to in the last two columns of FIG. 6A are illustrated by way of equation in FIG. 6B. In addition to being fixed across DBC systems for purposes of compatibility, the center frequencies indicated in FIGS. 6A and 6B have been selected for additional compatibility reasons. For example, the center frequencies depicted in FIGS. 6A and 6B were selected based upon the known harmonics of frequency synthesizing oscillators typically used in cellular equipment so that the same oscillators can be used in DBC equipment to minimize equipment costs. This is particularly valuable when the DBC equipment is multiple hyperband capable, e.g., capable of operating in more than one of the LMR, Cellular and the PCS frequency bands.

Figure 7:
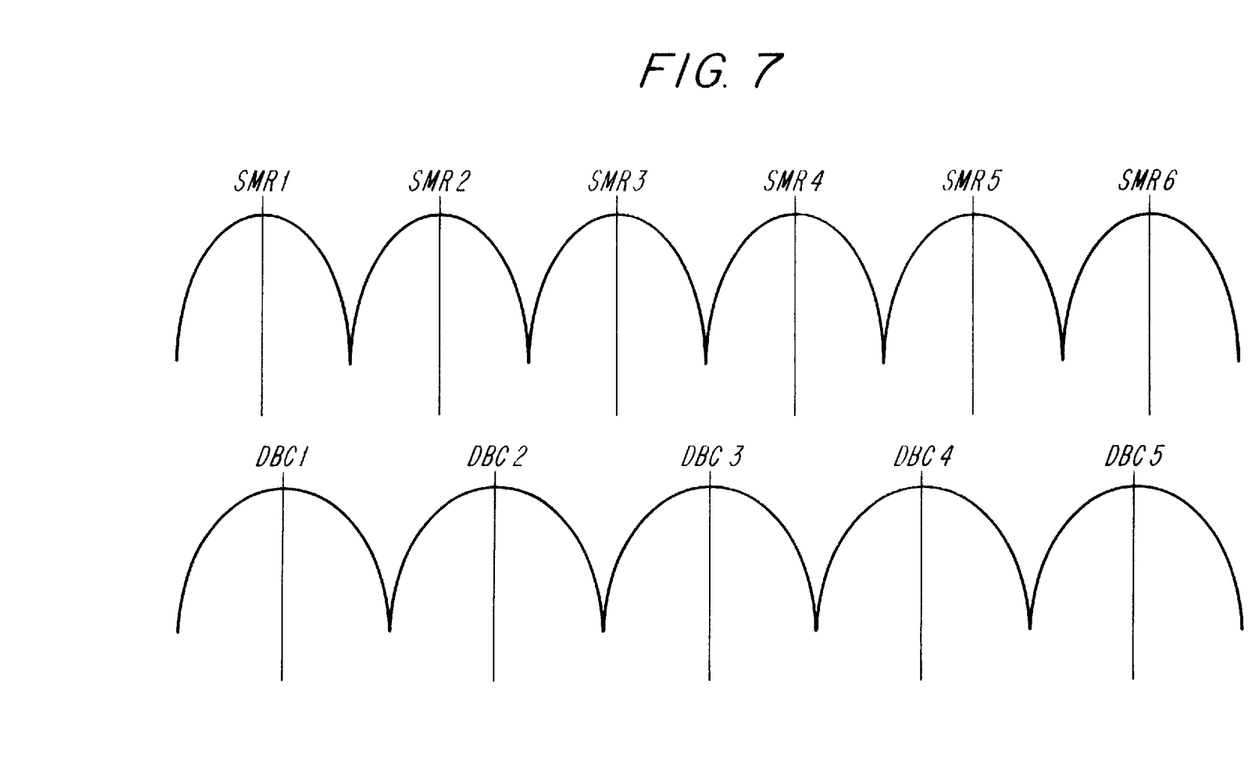
FIG. 7 illustrates mapping of LMR channels into DBC channels according to the present invention at a conceptual level.

By selecting DBC channels in the manner described above according to the present invention, a fixed relationship exists between the already specified 25 KHz LMR channels and the 30 KHz DBC channels specified herein. That is, for every six, 25 KHz LMR channels there exist five, 30 KHz DBC channels. This concept is illustrated in FIG. 7.

Figure 8:
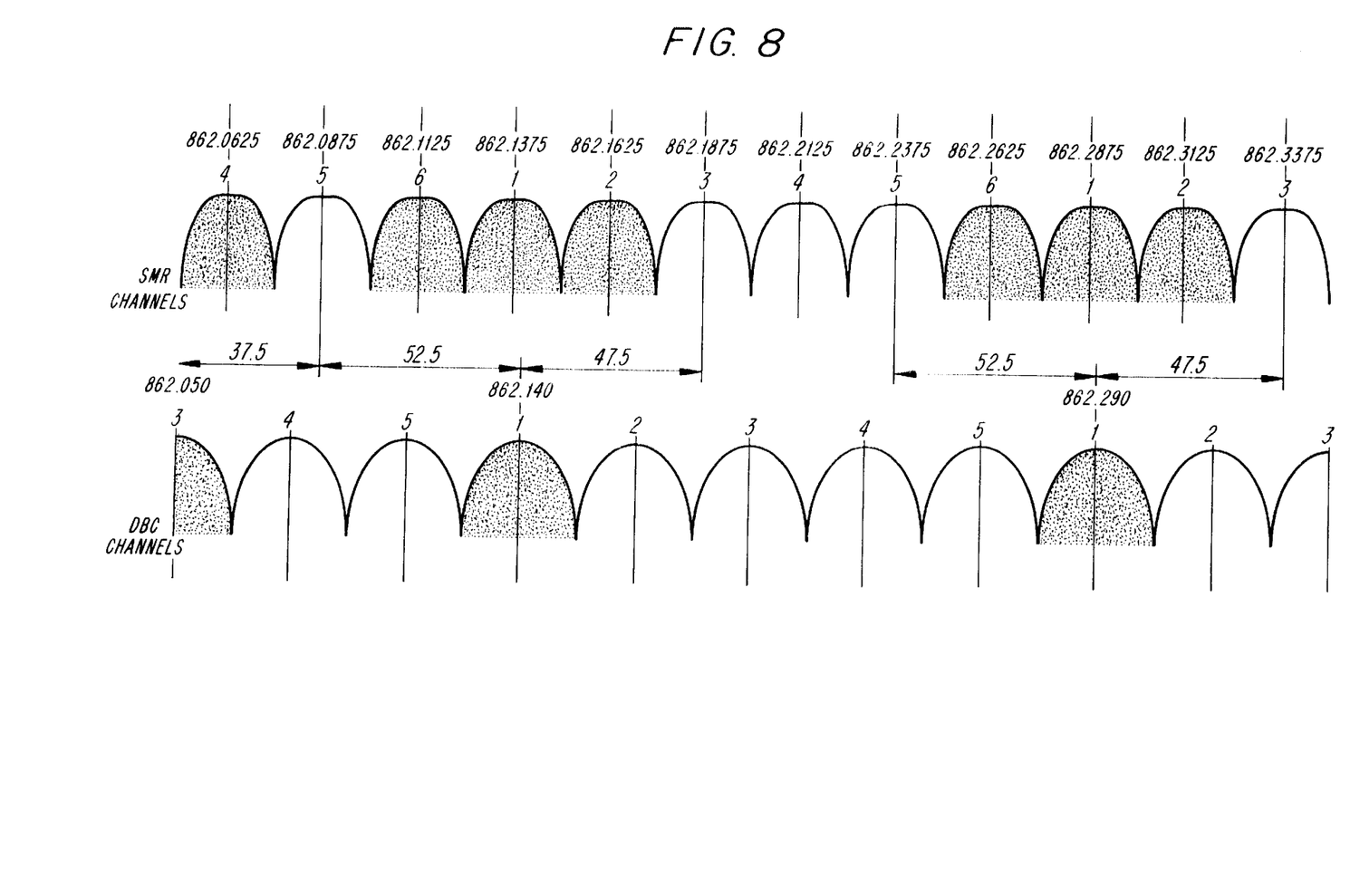
FIGS. 8–10 each illustrate a detailed example of how particular LMR channel groups can be rechannelized to provide DBC channels according to the present invention.

Of course in any given geographic area, not all of the LMR frequencies can be converted into DBC channels. As mentioned above with respect to the example of FIG. 5, certain network operators will own non-contiguous channels and channel groups. It is interesting to note, as shown in FIG. 8, that given the same network ownership of LMR channels illustrated in the upper spectrum of FIG. 5, only two DBC channels according to the present invention can be created when using the DBC channels specified in FIG. 6A and 6B. Note that in FIG. 4, where the network operator was permitted to select the 30 KHz channels' center frequencies, twice as many new 30 KHz channels were obtained. This illustrates one of the tradeoffs recognized and selected by Applicant according to the present invention—potentially lower spectrum utilization efficiency but much better compatibility due to uniformity of channel center locations across systems. In FIG. 8, the repetitive six channel LMR pattern and five channel DBC pattern is reflected by the numbers provided directly above the parabola channel representations. Note that these are not actual channel numbers and are, therefore, referred to in quotes below. Center frequencies are also provided in a smaller font where appropriate.

Thus, according to this exemplary scenario, the "6", "1" and "2" LMR channels owned by this particular operator can only be converted into a number "1" DBC channel since the bandwidths of DBC channels "5" and "2" fall outside the spectrum owned by the operator. Although this may seem somewhat spectrally inefficient, several techniques can be used to avoid or ameliorate this effect of DBC channelization. For example, network operators can negotiate among themselves to obtain contiguous LMR spectrums so that DBC channelization is more spectrally efficient. Even if this is not possible, the remaining spectrum can be put to other worthwhile purposes. For example, in FIG. 7 the distance between center frequencies for active DBC channel "1" and active LMR channel "5" (after this network operator converts to the DBC channels illustrated in the lower spectrum) is 52.5 KHz. This translates into an unused band of 25 KHz, which can be used as a large, inherent guard band. Guard bands are used to provide a buffer between adjacent frequencies to protect against adjacent channel interference, which is discussed in more detail below. Alternatively, this extra bandwidth can be used for transmitting signals based upon alternative technologies. Even though a 1:1 LMR to DBC channelization ratio is not obtained, it is envisioned that DBC channels will be allocated according to well known frequency re-use techniques, thus providing a substantial capacity increase over the conventional usage of the LMR spectrum.

Figure 9:
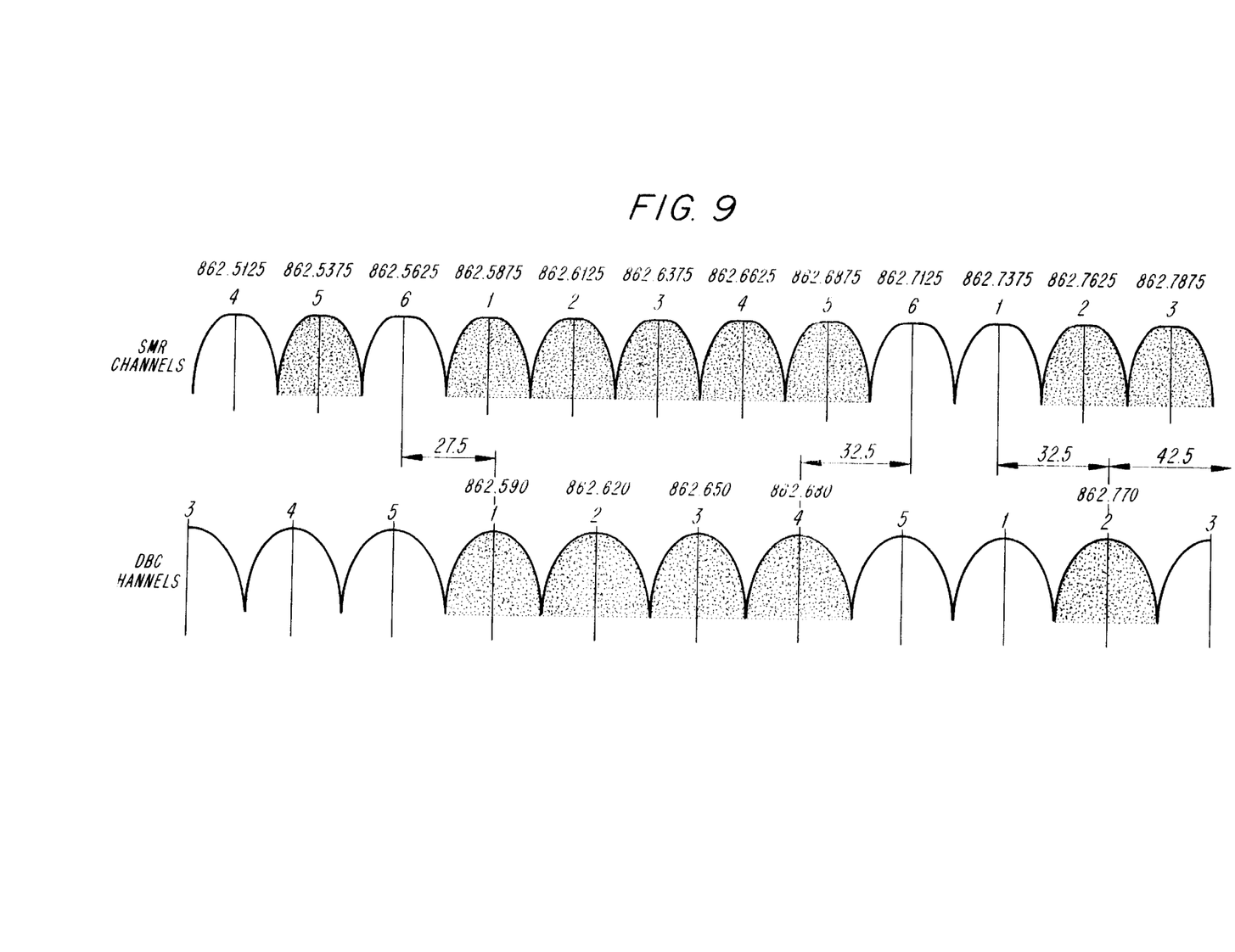
Figure 10:
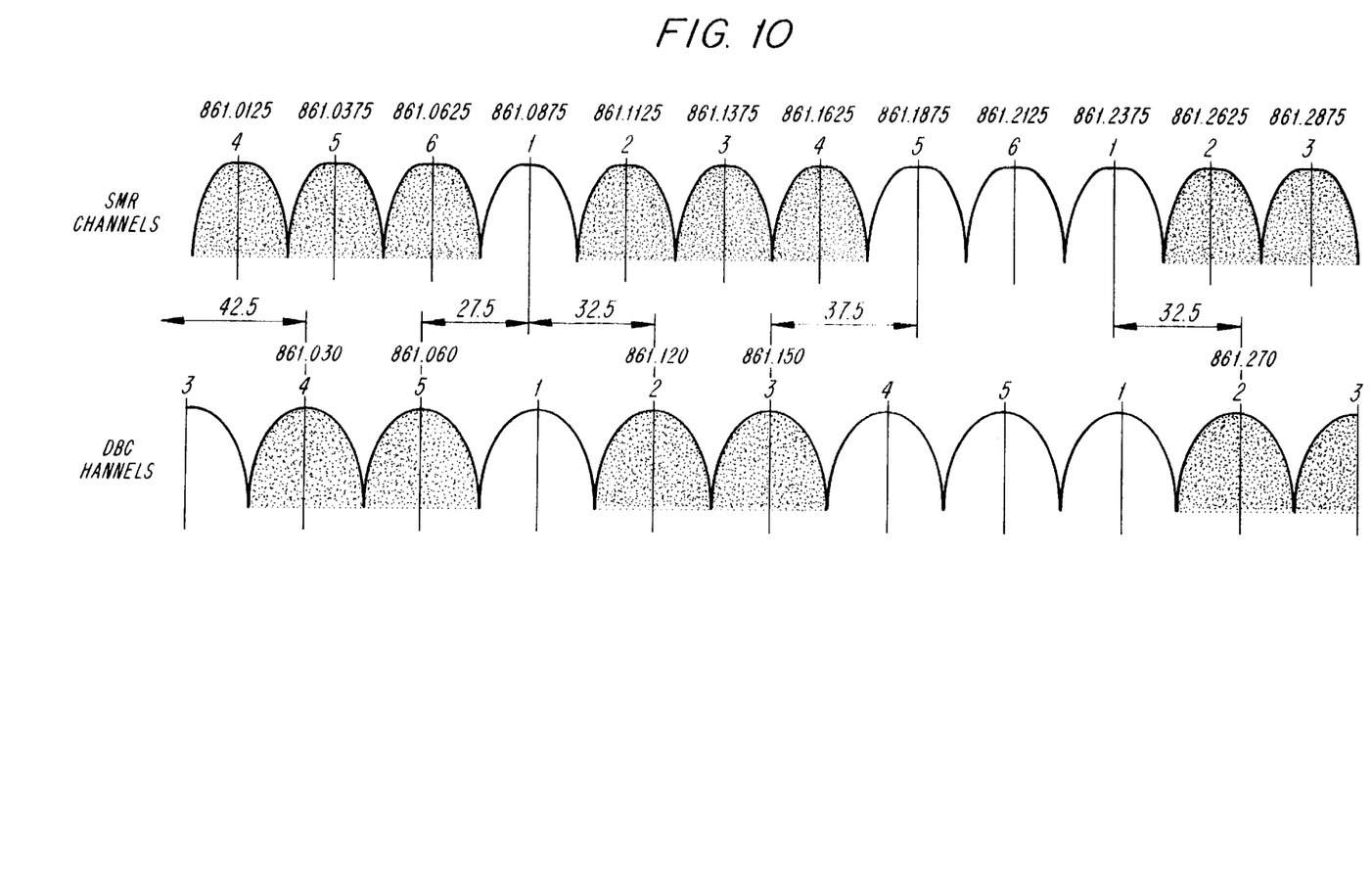

Other exemplary transformations of an LMR operator's owned portion of the LMR spectrum into DBC channels are illustrated in FIGS. 9 and 10. In FIG. 9, an operator owns a set of five contiguous LMR channels, which can be converted into four DBC channels and a pair of contiguous LMR channels which can be converted into a single DBC channel. This figure also illustrates the minimum frequency distance between an LMR channel center and a DBC channel center. This occurs when an active LMR channel of type "6" is operating next to an active DBC channel of type "1". Accordingly, adjacent channel interference considerations must take into account this 27.5 KHz center to center distance as described below. The other DBC center frequency to LMR center frequency markings indicate that a 5 KHz guardband is provided between DBC channel type "4" and LMR channel type "6" and between LMR channel type "1" and DBC channel type "2" while a 15 KHz guardband exists on the other side of DBC channel type "2".

In FIG. 10, an LMR operator has two groups of three LMR channels available for DBC channelization. Thus, LMR channels "4", "5" and "6" are converted into DBC channels "4" and "5". Since this LMR operator does not own the next frequency, i.e., LMR channel type "1", a DBC channel at the next specified DBC center frequency cannot be created. However, additional guardband is provided for the following DBC channel type "2".

Given the spectral proximity between type "1" DBC channels and type "6" LMR channels, the issue arises as to whether or not the power transmitted on these LMR channels will affect reception of signals on these DBC channels and vice versa. Historically, this has been a particular concern in the LMR portion of the spectrum wherein directly adjacent channels can be used in the same geographic location. By way of contrast, frequency reuse patterns are typically employed in cellular systems such that the channels used at a particular site are commonly spaced relatively far apart, e.g., 210 KHz. In order to ensure that LMR network operators do not cause interference between each other's transmissions, the FCC has mandated stringent emission masks that dictate the spectral power which can be output by a transmitter both for the uplink (mobile to base station direction) and downlink (base to mobile station direction). The masks promulgated for downbanded cellular usage of the LMR spectrum is likely to be similar to those illustrated by functions 1100 and 1200 in FIGS. 11 and 12, respectively.

Figure 11:
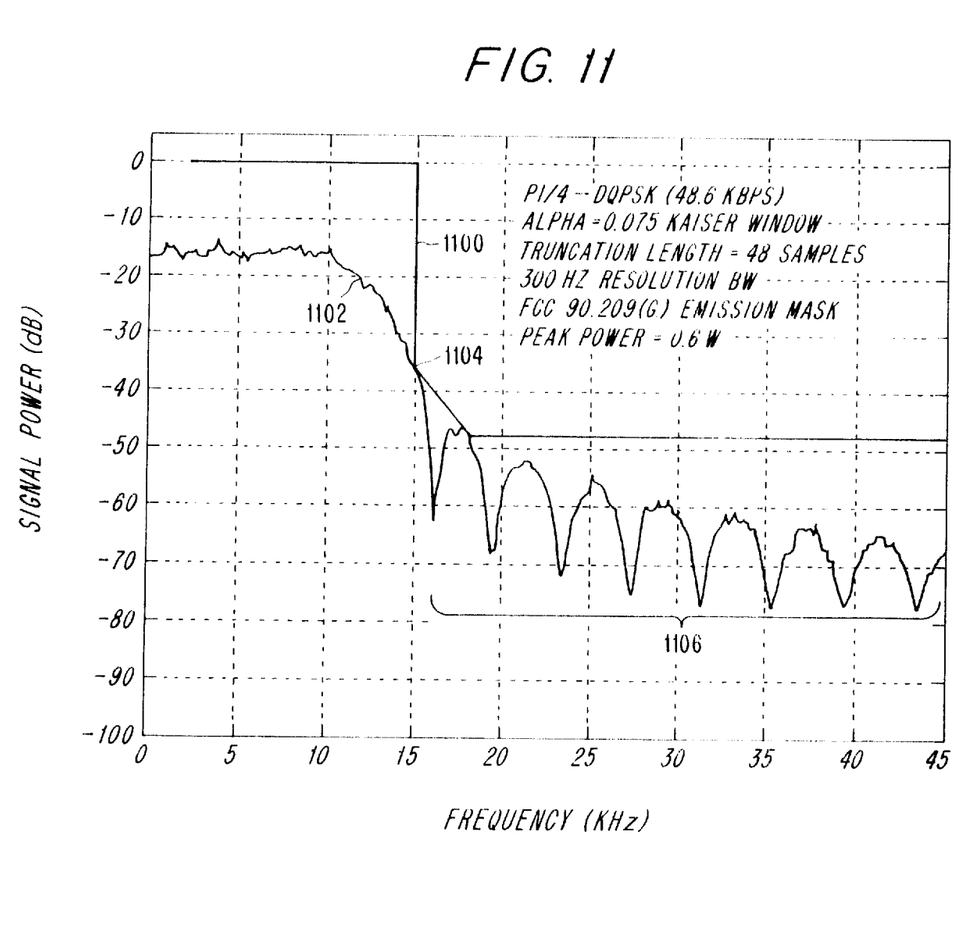
FIG. 11 illustrates an uplink spectral power mask defined by the FCC to limit adjacent channel interference and an output DBC transmit waveform generated from a remote station using transmit pulse shaping according to the present invention.
Figure 12:
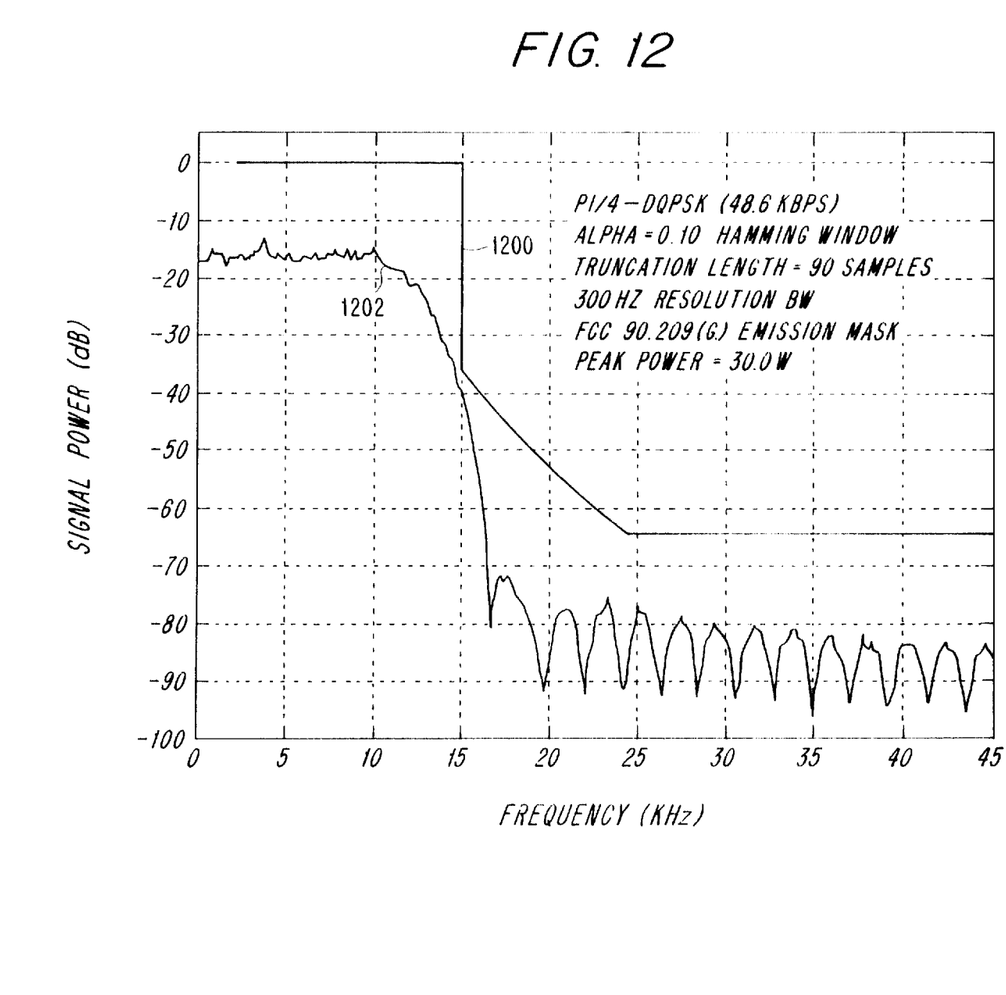
FIG. 12 illustrates an downlink spectral power mask defined by the FCC to limit adjacent channel interference and an output DBC transmit waveform generated by a base station using transmit pulse shaping according to the present invention.

It is believed, however, that the transmissions of conventional Cellular band equipment may result in spectral power output waveforms which violate masks 1100 and 1200 (depending upon the techniques used to represent the output power spectrum). Thus, according to another aspect of the present invention, a technique for providing downbanded cellular equipment which is in conformance with the masks 1100 and 1200 for operation in the LMR spectrum is outlined below.

In order to optimize a downbanded cellular system for operation in accordance with masks 1100 and 1200, both the transmit and receive signal processing circuitry of conventional Cellular equipment should be adjusted. However, since another object of the present invention is to minimize the changes made to existing Cellular equipment, to thereby reduce production cost and speed up implementation time, this exemplary embodiment of the present invention adapts only the transmit signal processing to create downbanded cellular transmissions whose spectral power outputs fall within the boundaries set forth by masks 1100 and 1200. More specifically, by adjusting the transmit pulse shaping filter characteristics in both the mobile station and base station's transmitters, the output waveforms can be adjusted to within acceptable limits, e.g., the waveforms 1102 and 1202 shown in FIGS. 11 and 12, respectively. An exemplary set of transmit pulse filter characteristics used in a Cellular system and those proposed herein for a downbanded cellular system to accommodate the masks 1100 and 1200 are illustrated in Tables A–D below, both for the uplink and downlink.

A. Cellular Uplink

| TX Pulse Parameter | Specification |
|---|---|
| Filter | SRC |
| Rolloff Factor (α) | 0.35 |
| Truncation Length | 48 samples |
| Sampling rate | 8 samples/symbol |
| Windowing | No Window |

B. DBC Uplink

| TX Pulse Parameter | Specification |
|---|---|
| Filter | SRC |
| Rolloff Factor (α) | 0.075 |
| Truncation Length | 48 samples |
| Sampling rate | 8 samples/symbol |
| Windowing | Kaiser Window |

C. Cellular Downlink

| TX Pulse Parameter | Specification |
|---|---|
| Filter | SRC |
| Rolloff Factor (α) | 0.35 |
| Truncation Length | 90 samples |
| Sampling rate | 8 samples/symbol |
| Windowing | No Window |

D. DBC Downlink

| TX Pulse Parameter | Specification |
|---|---|
| Filter | SRC |
| Rolloff Factor (α) | 0.035 |
| Truncation Length | 90 samples |
| Sampling rate | 8 samples/symbol |
| Windowing | Hamming Window |

For the uplink, as can be seen above, the rolloff factor of the transmit pulse filter was reduced from 0.35 to 0.075 so that the main lobe of the output power function 1102 was brought down below the corner 1104 of mask 1100. In doing so, however, the side lobes 1106 of output function 1102 were moved up sufficiently to violate mask 1100. Accordingly, a Kaiser windowing function was selected as part of the filtering methodology, to suppress the side lobes so that they too conformed with mask 1100. Similarly, a rolloff factor of 0.10 and a Hamming window function were selected to enforce the constraints required by mask 1200 for the downlink output transmission spectrum 1202.

The above-described exemplary embodiments are intended to be illustrative in all respects, rather than restrictive, of the present invention. Although the foregoing exemplary embodiments have been described in terms of base and mobile stations, the present invention can be applied to any radiocommunication system. For example, satellites could transmit and receive data in communication with DBC remote devices, including portable units, personal digital assistants, etc.

Moreover, although the present invention has been described primarily in terms of communicating within the LMR spectrum, the present invention is also intended to be used in multiple hyperbands, e.g,. in a dual-mode DBC and Cellular band mobile phone. For example, the mobile station can be implemented to operate in the A-side cellular band and a portion of the LMR band. This DBC mobile station has the advantage of being able to use existing cellular networks which allow a DBC network operator to offer a nationwide roaming footprint. Readers interested in aspects of multiple hyperband capable systems are referred to U.S. patent application Ser. No. 08/425,051 entitled "Multiple Hyperband Mobile and Base Stations" to Krister Raith filed on Apr. 19, 1995, the disclosure of which is incorporated here by reference. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for using an LMR portion of a frequency spectrum, which LMR portion is typically used to provide transmission trunked communication on channels having 25 KHz bandwidths, to instead provide downbanded cellular radiocommunication service, the method comprising the steps of:

redefining said LMR portion of the frequency spectrum to provide downbanded cellular channels having 30 KHz bandwidths;

allocating, to a network operator, at least one downbanded cellular channel, which downbanded cellular channel is determined based on an amount of contiguous spectrum covered in two adjacent 25 KHz channels controlled by said operator; and transmitting signals between stations over an air interface using said at least one allocated downbanded cellular channel to provide radiocommunication services.

2. The method of claim 1, wherein said step of redefining further comprises the step of;

defining a channel center frequency for said downbanded cellular channel according to the following relationship:

| Transmitter | Channel Number | Center Frequency MHz |
|---|---|---|
| Mobile | $1 \leq N \leq 600$ | 0.030 (N) + 805.980 |
| Base | $1 \leq N \leq 600$ | 0.030 (N) + 850.980 |

3. The method of claim 2, wherein said step of allocating further comprises the step of:

allocating said downbanded cellular channel which is encompassed by said contiguous spectrum controlled by said operator.

4. The method of claim 1, wherein said step of transmitting signals using said allocated downbanded cellular channel further comprises the step of:

filtering said signals according to mask limitations so as to reduce adjacent channel interference.

5. The method of claim 3, further comprising the step of:

using any remaining portion of said contiguous spectrum which is outside of allocated downbanded cellular channels as guard band between said downbanded cellular channels and active LMR channels controlled by another operator.

6. A method for providing downbanded cellular (DBC) radiocommunications services comprising the steps of:

defining a plurality of 30 KHz DBC channels in the frequency ranges from 806–824 MHz and 851–869 MHz at predetermined center frequencies;

comparing an operator's contiguous 25 KHz channels with said defined 30 KHz channels;

allocating a defined 30 KHz DBC channel to said operator where said step of comparing indicates that said defined 30 KHz DBC channel is covered by two of said operator's contiguous 25 KHz channels; and transmitting signals between stations over an air interface to provide said DBC radiocommunications services using said allocated 30 KHz DBC channel.

7. The method of claim 6, wherein said stations include a mobile station and a base station.

8. The method of claim 6, wherein said step of defining further comprises the step of:

defining said predetermined center frequencies according to the following relationship:

| Transmitter | Channel Number | Center Frequency MHz |
|---|---|---|
| Mobile | $1 \leq N \leq 600$ | 0.030 (N) + 805.980 |
| Base | $1 \leq N \leq 600$ | 0.030 (N) + 850.980 |

9. The method of claim 6, further comprising the step of:

using a remaining portion of said contiguous spectrum which is outside of said allocated 30 KHz DBC channel as guard band between said allocated 30 KHz DBC channel and active LMR channels controlled by another operator.

10. The method of claim 6, wherein said step of transmitting signals using said allocated 30 KHz DBC channel further comprises the step of:

filtering said signals according to mask limitations so as to reduce adjacent channel interference.

* * * * *